(12) United States Patent
Tethrake et al.

(10) Patent No.: US 7,705,733 B2
(45) Date of Patent: Apr. 27, 2010

(54) COILED RFID TAG

(75) Inventors: Steven M. Tethrake, Collierville, TN (US); Robert Varner, Germantown, TN (US); Jeffrey H. Nycz, Collierville, TN (US)

(73) Assignee: Warsaw Orthopedic, Inc.

( * ) Notice: Subject to any disclaimer, the term of this patent is extended or adjusted under 35 U.S.C. 154(b) by 516 days.

(21) Appl. No.: 11/326,460

(22) Filed: Jan. 6, 2006

(65) Prior Publication Data

US 2007/0159336 A1 Jul. 12, 2007

(51) Int. Cl.
G08B 13/14 (2006.01)

(52) U.S. Cl. .................. 340/572.8; 340/10.1; 340/442; 340/445; 340/447; 257/679; 257/688; 235/385; 235/492

(58) Field of Classification Search ............. 340/572.7, 340/572.8, 10.1, 442, 445, 447; 257/679, 257/688, 678; 243/873, 787; 235/385, 492
See application file for complete search history.

(56) References Cited

U.S. PATENT DOCUMENTS

| | | | |
|---|---|---|---|
| 5,084,699 A * | 1/1992 | DeMichele | ............. 340/10.34 |
| 5,552,790 A * | 9/1996 | Gunnarsson | ................. 342/51 |
| 5,963,144 A | 10/1999 | Kruest | |
| 5,986,562 A | 11/1999 | Nikolich | |
| 6,043,746 A | 3/2000 | Sorrells | |
| 6,045,652 A | 4/2000 | Tuttle et al. | |
| 6,069,564 A | 5/2000 | Hatano et al. | |
| 6,094,173 A | 7/2000 | Nylander | |
| 6,097,301 A | 8/2000 | Tuttle | |
| 6,100,804 A | 8/2000 | Brady et al. | |
| 6,130,612 A | 10/2000 | Castellano et al. | |
| 6,147,606 A | 11/2000 | Duan | |
| 6,147,655 A | 11/2000 | Roesner | |
| 6,204,764 B1 | 3/2001 | Maloney | |
| 6,215,402 B1 | 4/2001 | Rao Kodukula et al. | |
| 6,243,012 B1 | 6/2001 | Shober et al. | |
| 6,265,977 B1 * | 7/2001 | Vega et al. | ............... 340/572.7 |
| 6,366,260 B1 | 4/2002 | Carrender | |
| 6,400,274 B1 | 6/2002 | Duan et al. | |
| 6,407,665 B2 | 6/2002 | Maloney | |
| 6,424,263 B1 | 7/2002 | Lee et al. | |
| 6,445,297 B1 | 9/2002 | Nicholson | |
| 6,462,661 B2 | 10/2002 | Pfeiffer et al. | |
| 6,496,113 B2 | 12/2002 | Lee et al. | |
| 6,549,176 B2 | 4/2003 | Hausladen | |
| 6,563,425 B2 | 5/2003 | Nicholson et al. | |

(Continued)

FOREIGN PATENT DOCUMENTS

JP 2006-210493 * 10/2006

*Primary Examiner*—Tai T Nguyen

(57) ABSTRACT

A coiled RFID tag that includes an RFID transponder circuit that is formed over a generally cylindrically-shaped substrate core so that portions of the antenna of the transponder circuit circumscribe the substrate core. With this configuration, the tag may be applied to objects without regard to antenna orientation. The transponder circuit and substrate core are encased in a protective material that will prevent ingress of moisture and dust, insulate from heat and cold but will allow radio frequency waves to pass without significant attenuation. The tag may be attached various items by an overmolding process in the formation of a grip of other portions. Alternatively, the tag may be attached to objects by forming it into a flexible sleeve-like portion that is pulled over objects and maintained in position by the resilient properties of the sleeve.

16 Claims, 4 Drawing Sheets

U.S. PATENT DOCUMENTS

| | | |
|---|---|---|
| 6,621,417 B2 | 9/2003 | Duncan et al. |
| 6,690,264 B2 | 2/2004 | Dalglish |
| 6,693,541 B2 | 2/2004 | Egbert |
| 6,696,952 B2 | 2/2004 | Zirbes |
| 6,724,308 B2 | 4/2004 | Nicholson |
| 6,897,827 B2 | 5/2005 | Senba et al. |
| 6,899,476 B1 | 5/2005 | Barrus et al. |
| 6,914,562 B2 | 7/2005 | Forster |
| 6,929,412 B1 | 8/2005 | Barrus et al. |
| 6,940,408 B2 | 9/2005 | Ferguson et al. |
| 6,956,472 B1 | 10/2005 | Walcott, Jr. et al. |
| 6,963,317 B2 | 11/2005 | Zuk et al. |
| 7,002,461 B2 | 2/2006 | Duncan et al. |
| 7,002,474 B2 | 2/2006 | De Souza et al. |
| 7,002,475 B2 | 2/2006 | Brady et al. |
| 7,009,515 B2 | 3/2006 | Carrender |
| 7,019,651 B2 | 3/2006 | Hall et al. |
| 7,126,482 B2 * | 10/2006 | Shoji et al. ............... 340/572.7 |
| 7,176,846 B2 * | 2/2007 | Mejia et al. ................. 343/873 |
| 7,495,625 B2 * | 2/2009 | Endo et al. .................. 343/788 |
| 2001/0006368 A1 | 7/2001 | Maloney |
| 2002/0008623 A1 | 1/2002 | Garber et al. |
| 2002/0021208 A1 | 2/2002 | Nicholson et al. |
| 2002/0041233 A1 | 4/2002 | Nicholson |
| 2002/0044057 A1 | 4/2002 | Zirbes |
| 2002/0067266 A1 | 6/2002 | Lee et al. |
| 2002/0067267 A1 | 6/2002 | Kirkham |
| 2002/0067268 A1 | 6/2002 | Lee et al. |
| 2002/0130778 A1 | 9/2002 | Nicholson |
| 2002/0167405 A1 | 11/2002 | Shanks et al. |
| 2002/0167406 A1 | 11/2002 | Garber et al. |
| 2002/0196146 A1 | 12/2002 | Moore |
| 2003/0016133 A1 | 1/2003 | Egbert |
| 2004/0074974 A1 | 4/2004 | Senba et al. |
| 2004/0112964 A1 | 6/2004 | Empedocles et al. |
| 2004/0215350 A1 | 10/2004 | Roesner |
| 2004/0217865 A1 | 11/2004 | Turner |
| 2004/0252026 A1 | 12/2004 | Hall et al. |
| 2005/0001725 A1 | 1/2005 | Brady et al. |
| 2005/0052283 A1 | 3/2005 | Collins et al. |
| 2005/0092836 A1 | 5/2005 | Kudo |
| 2005/0098302 A1 | 5/2005 | Hsieh |
| 2005/0104790 A1 | 5/2005 | Duron |
| 2005/0110641 A1 | 5/2005 | Mendolia et al. |
| 2005/0110674 A1 | 5/2005 | Mendolia et al. |
| 2005/0133131 A1 * | 6/2005 | Starinshak ............... 152/152.1 |
| 2005/0151651 A1 | 7/2005 | Tan et al. |
| 2005/0156806 A1 | 7/2005 | Ohta et al. |
| 2005/0174239 A1 | 8/2005 | Shanks et al. |
| 2005/0179552 A1 | 8/2005 | Shoji et al. |
| 2005/0194442 A1 | 9/2005 | Adams et al. |
| 2005/0199731 A9 | 9/2005 | Empedocles et al. |
| 2005/0212660 A1 | 9/2005 | Hansen et al. |
| 2005/0212674 A1 | 9/2005 | Desmons et al. |
| 2005/0237198 A1 | 10/2005 | Waldner et al. |
| 2005/0242958 A1 | 11/2005 | Lyon et al. |
| 2005/0253725 A1 | 11/2005 | Neuwirth et al. |
| 2005/0270159 A1 | 12/2005 | Brady et al. |
| 2005/0280512 A1 | 12/2005 | Forster |
| 2006/0000915 A1 | 1/2006 | Kodukula et al. |
| 2006/0001585 A1 | 1/2006 | Saito et al. |
| 2006/0012482 A1 | 1/2006 | Zalud et al. |
| 2006/0017571 A1 | 1/2006 | Arnold et al. |
| 2006/0033607 A1 | 2/2006 | Bellantoni |
| 2006/0043198 A1 | 3/2006 | Forster |
| 2006/0054710 A1 | 3/2006 | Forster et al. |
| 2006/0055539 A1 | 3/2006 | Lawrence et al. |
| 2006/0055540 A1 | 3/2006 | Lawrence et al. |
| 2006/0055541 A1 | 3/2006 | Bleckmann |
| 2006/0055620 A1 | 3/2006 | Oliver et al. |

* cited by examiner

COILED RFID TAG

FIELD OF THE INVENTION

Embodiments of the invention generally relate to radio frequency identification systems, and more particularly to a coiled RFID transponder tag for use with a variety of different shaped devices and equipment. The coiled RFID transponder tag may be particularly suited for application to medical and surgical devices, hand tools and other equipment.

DESCRIPTION OF RELATED ART

Electronic data carrying memory devices are known. These devices provide a means for tracking and providing information about tools, equipment, inventory and other items. Memory devices permit linking of large amounts of data with an object or item. They typically include a memory and logic in the form of an integrated circuit ("IC") and a mechanism for transmitting data to and/or from the product or item attached to the memory device. An example of such a memory device-based product identification technology is radio frequency identification (RFID).

Radio frequency identification (RFID) systems use an RF field generator (reader) to wirelessly extract identification information (i.e., UPC, product name, etc.) contained in RFID transponder attached to various products and objects. RFID tags are miniature electronic circuits that typically consist of a coil that acts as an antenna and a small silicon-based microprocessor with a memory, all encapsulated in a protective material. RFID tags store identification information, usually in the form of an identification number that corresponds to an object or item to which the tag is attached. This number may be used to index a database containing price, product name, manufacture and/or other information. When a transponder tag enters an RF field generated by a reader device, the circuit of the tag becomes energized causing the processor to perform a data operation, usually by emitting a signal containing the processor's stored information. The basic structure and operation of RFID tags can be found in, for example, U.S. Pat. Nos. 4,075,632, 4,360,801, 4,390,880, 4,739,328 and 5,030,807, the disclosures of which are hereby incorporated by reference in their entirety.

RFID tags generally are formed on a substrate, such as, for example, paper, and can include analog RF circuits, digital logic, and memory circuits. RFID tags also can include a number of discrete components, such as capacitors, transistors, and diodes. RFID tags are categorized as either active or passive. Active tags have their own discrete power source such as a battery. When an active tag enters an RF field it is turned on and then emits a signal containing its stored information. Passive tags do not contain a power source. Rather, they become inductively or capacitively charged when they enter an RF field. Once the RF field has activated the passive circuit, the tag emits a signal containing its stored information. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate to the RF signal to transmit the retrieved data. In addition to retrieving and transmitting data previously stored in the memory, both passive and active dynamic RFID tags can permit new or additional information to be written to a portion of the RFID tag's memory, or can permit the RFID tag to manipulate data or perform some additional functions.

Though originally invented to track feeding of cattle, RFID tags are today utilized in a variety of applications including retail security, inventory management, and even computerized checkout. With the price of RFID tags now reaching as low as 5 cents per tag, and because of reductions in size due to an overall trend towards miniaturization in circuit design, RFID tags currently are being applied to many types of products, both at the consumer level as well as in manufacturing processes. RFID tags enable manufacturers to wirelessly track products from the manufacturing stage to the point-of-sale. They provide a robust, cost effective, efficient and accurate solution to inventory tracking and management.

Current commercially available RFID tags, both active and passive, generally come in one of two configurations: inductively or capacitively coupled. Inductively coupled tags, the first type of RFID tags developed, consist of a silicon-based microprocessor, a metal coil wound into a circular pattern which serves as the tag's antenna, and an encapsulating material that wraps around the chip and coil. These tags are powered by an electromagnetic field generated by the tag reader. The tag's antenna picks up the electromagnetic energy which in turn powers the chip. The tag then modulates the electromagnetic field in order to transmit data back to the reader. Despite advances in silicon manufacturing processes, inductively coupled tags have remained relatively expensive due to the coil antenna and the manufacturing process required to wind the coil around the surface of the tag.

The second type of RFID tags, capacitively coupled tags, eliminate the metal coil, consisting instead of a silicon microprocessor, paper substrate, and a conductive carbon ink that is applied to the paper substrate through a conventional printing means. By using conductive ink and conventional printing processes, a relatively low cost, disposable tag can be created that is easily integrated into conventional product labels.

RFID tags are rapidly becoming the preferred method of inventory tracking in retail and distribution applications and will likely surpass bar codes as the preferred point-of-sale checkout identifier. Large retail chains such as WALMART Corporation are already requiring their suppliers to utilize RFID tags for tracking shipments. RFID tags have significant advantages over bar code labels. For example, bar codes are limited in size by resolution limitations of bar code scanners, and the amount of information that the symbols can contain is limited by the physical space constraints of the label. Therefore, some objects may be unable to accommodate bar code labels because of their size and physical configuration. In contrast, RFID tags store their information in digital memory. Thus, they can be made much smaller than bar code tags.

Another advantage of RFID tags over bar codes is that bar code readers requires line of sight in order to read the reflection pattern from a bar code. As labels become worn or damaged, they can no longer be read with the bar code scanner. Also, because a person operating the bar code scanner must physically orient either the scanner or the product to achieve line of sight on each item being scanned, items must be scanned one at a time resulting in prolonged scan time. RFID tags, on the other hand, are read through radio waves, which do no require line of sight because they are able to penetrate light impermeable materials. This not only eliminates the line of sight requirement, but also allows rapid identification of a batch of tagged products.

Yet another relative advantage of RFID tags over bar code labels is that for dynamic RFID tags, the information stored in the tag may be updated using a writing device to wirelessly transmit the new information to be stored. Updating information in bar code tags typically requires printing a new tag to replace the old.

One problem associated with the use of RFID tags, which also is common to bar code tags, is that it can be difficult to securely attach the tags to various goods and products. As discussed above, capacitively coupled RFID tags usually are printed on a paper substrate and then attached to various items using an adhesive bonding. However, in some applications, a paper tag may not hold up to the rigors of the environment in which the product is used. For example, in the field of medical equipment, and in particular, surgical instruments and surgical instrument storage and sterilization systems, items are routinely exposed to environments containing various combinations of high temperatures, high pressure and liquid, vaporous and/or gaseous chemical sterilants. Even in non-medical environments, hand tools and other equipment may be subjected to harsh physical conditions through ordinary use. Over time, a paper RFID tag would not provide reliable performance under these harsh conditions. More rugged RFID tags have been developed as a potential solution to this problem. An example of a rugged RFID tag is provided in U.S. Pat. No. 6,255,949, the disclosure of which is hereby incorporated by reference in its entirety. The '949 patent discloses an RF transponder tag surrounded by a thermally resistant polymer and encapsulated in a hardened case. Because radio frequency waves can penetrate such materials, performance of the tag is not degraded by the case or polymer. Such a configuration prevents damage to the transponder tag if exposed to high temperature environments.

While making the tag enclosure more rugged may sometimes protect the internal components of the tag, this still does not solve the problem of keeping the tag securely attached, particularly in harsh environments. As discussed above, substrate based tags, even ruggedized tags, are typically mounted using an adhesive. This presents at least two problems for the application of tags exposed to harsh environments. First, adhesives will break down and lose their adhesive property when they are exposed to heat and moisture. This limits their usage to dry "friendly" environments. Second, adhesives typically require a flat surface on which to mount the RFID tags. This precludes the mounting of tags onto devices, equipments, or containers that do not have a flat surface of sufficient dimensions. Furthermore, many items do not have geometrically shaped portions sufficiently large to accommodate such a substrate based tag. Thus, for at least these reasons, adhesives do not provide an effective solution for attaching RFID tags in certain environments.

A proposed solution to the above described attachment problem has been to integrate the RFID tag into a bracelet or strap. This can be particularly useful for patient or personal monitoring systems. U.S. Pat. No. 6,104,295 describes such an electronic band having an integral RFID tag. However, a problem with this solution is that the band's width will preclude application of the bracelet to small items. Also, because the portion of the band defined by the tag is rigid, this will dictate the minimum width that the band strap can be adjusted to. Thus, for items having a small diameter, only a loose fitting will be possible.

As noted above, the problems of attachment as well as ruggedization may particularly acute in the field of medical equipment and instruments, but may also be acute in other areas as well including construction, manufacturing, repair, etc. Tools and equipment used in these fields are regularly exposed to harsh environments in their ordinary course of use, whether through sterilization or simply the environments, applications and conditions in which they are used. Also, this equipment is typically expensive and highly mobile. Thus, there is a strong need for accurate and efficient tracking that does not impede or interfere with the utility of these tools and equipment.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Based on the foregoing, it would be desirable to provide an RFID tag that overcomes or ameliorates some or all of the shortcomings of conventional tags. In particular, it would be desirable to provide an RFID tag that can withstand the rigors of sterilization and other harsh environments and that can also be cheaply and easily used with new as well as existing instruments and equipment, that enhances tag readability by reducing orientation dependence, and that can be securely attached to objects that are devoid of large flat surfaces.

Thus, it is a feature of various embodiments of the invention to provide an RFID tag that is sufficiently ruggedized to permit use of the tag in moist, heated, cooled, pressurized or other destructive environments. It is a further feature of embodiments of the invention to provide an RFID tag that may be read from multiple orientations.

Another feature of various embodiments of the invention provides an RFID tag that can be attached to objects of differing shapes. An additional feature of various embodiments of the invention provides an RFID tag that can be easily attached to medical instruments and other tools and objected through an overmolding process.

To achieve the above-noted features, and in accordance with the purposes as embodied and broadly described herein, one exemplary embodiment provides a coiled RFID tag. The coiled RFID tag according to this embodiment comprises a substantially cylindrically-shaped substrate core, and an RFID transponder circuit formed surrounding the substrate core.

In accordance with another exemplary embodiment, an RFID tag is provided. The RFID tag according to this embodiment comprises an RFID transponder circuit formed over and around a non-conductive substrate core.

In accordance with a further exemplary embodiment, a method of manufacturing a coiled RFID tag is provided. The method according to this embodiment comprises forming a cylindrically-shaped substrate core, and forming a transponder circuit on the substrate core, wherein at least a portion of the transponder circuit, circumscribes 360° of the substrate core.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

Purposes and advantages of the embodiments will be apparent to those of ordinary skill in the art from the following detailed description in conjunction with the appended drawings in which like reference characters are used to indicate like elements, and in which.

DETAILED DESCRIPTION

Figure 1:
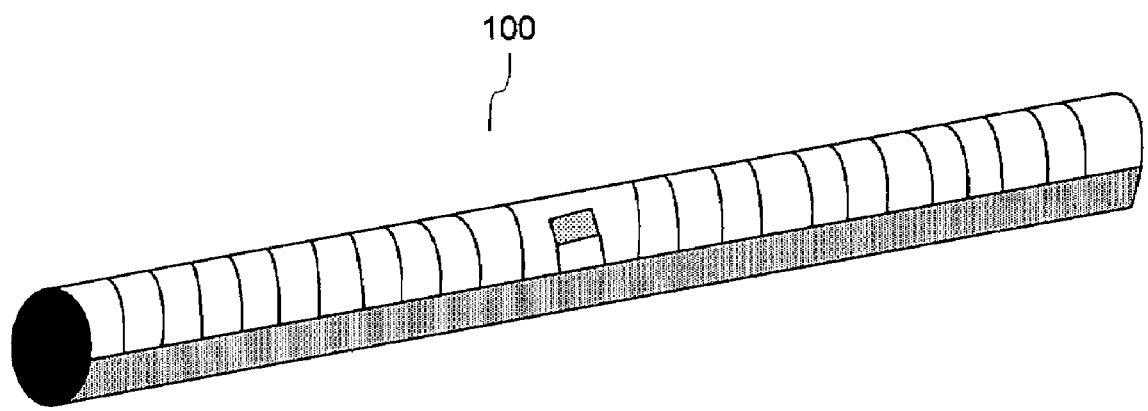
FIG. 1 is a perspective view of an exemplary coiled RFID tag according to at least one embodiment of the invention.

The following description is intended to convey a thorough understanding of the embodiments described by providing a number of specific embodiments and details involving coiled RFID transponder tags and methods of manufacturing coiled RFID transponder tags. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As used herein, the expressions "RFID tag" and "RFID transponder tag" will refer to any active or passive type of electronic data storage device, read-only or read and write, that is wirelessly activated in the presence of a radio frequency (RF) field, including any currently available inductively coupled RFID tags, capacitively coupled RFID tags and even future RF-type tags not yet available. This includes tags operating in the 125 kHz, 13.56 MHz, 868-927 MHz, 2.45 GHz and 5.8 GHz frequency bands as well as other suitable frequency bands. Also, the tag may be a silicon-type IC tag, a printed tag printed with a conductive ink-based printing process or a tag formed by other suitable means.

As used herein, the expressions and terms "surgical instrument," "medical instrument," "instrument," or "device" will refer to any type of surgical or medical instrument, portable equipment or device, tool or hand tool, to which it may be desirable to attach an RFID tag. Though the specification is written in the context of medical and/or surgical instruments, it should be appreciated that the coiled RFID tag of the embodiments may be used with a variety of different items to be identified as shape and design constraints permit, including tools and equipment in other fields unrelated to the medical field. This may include hand tools or other objects and/or equipment that are used in construction, manufacturing, maintenance or other industries. All of these uses are within the intended scope of the embodiments of the invention.

Through out this description, the expression "coiled RFID tag" will be given broad meaning including, but not limited to, any type of RFID transponder tag that consists of a transponder circuit that is mounted on a substantially cylindrical substrate core and then encased in protective outer shell thereby permitting the tag to be overmolded to various instruments, hand tools and other objects to be identified. "Coiled" will generally refer to the manner in which the antenna portion surrounds the substrate core so that the tag does not need to be oriented in a particular way when attached to objects. Though a wire antenna is the primary type of antenna shown and discussed in the various embodiments of the invention, it should be appreciated that other antenna configurations may be substituted without departing from the spirit or scope of the invention. For example, part or all of the substrate core may serve as the antenna. In various embodiments, the coiled tag will attach to an instrument or tool by overmolding the tag into a grip or other portions of an instrument or device, during the later stages of the manufacturing process thereby eliminating the need to embed the tag in the device. Alternatively, the tag may be attached retroactively to existing objects after the objects are manufactured or even after they are in use by integrating the tag into a flexible sleeve, grip or other suitable structure that can be easily but securely attached to objects after they are manufactured.

Described above are certain problems associated with the use of RFID tags on medical and/or surgical instruments. One proposed solution to the problem of RFID tags for surgical instruments and other surgical equipment has been to embed RFID transponder tags in a portion of the instrument at the time of manufacture. While ideal in theory, this solution may still suffer from some practical difficulties. First, this approach requires the tool or instrument to have been manufactured with the RFID tag inside. This is undesirable because it complicates the manufacturing process thereby increasing its expense, and it prohibits application of the technology to existing equipment through retrofitting. Second, the individual surgical instruments and equipment often have a high metal content. Because the tag is embedded in the metal, reading of the tag can be difficult due to losses in the metal of the electromagnetic signal. Finally, if the tag stops functioning, the entire instrument must be discarded, or else RF identification techniques can not be utilized with it. Thus, embedding still suffers from some significant technical obstacles. In view of these obstacles, various embodiments of this invention provide a coiled RFID tag that can be securely, but removeably attached over external portions of a surgical instrument or other object to be identified through an overmolding process. Overmolding may overcome many of the obstacles associated with implementing embedded RFID tags. Because the various embodiments of the invention provide a tag that may be attached to objects without regard to orientation, the tag according to these embodiments, may be particularly well suited for attachment through an overmolding process. In overmolding, or soft-touch overmolding, a thermoplastic elastomer (TPE) materials is injection molded over or around a compatible substrate using either insert or multi-shot processes. The resulting hard-soft structures are effective in providing comfortable, non-slip, and abrasion-resistant handles, grips and buttons.

Referring now to FIG. 1, a coiled RFID transponder tag 100 is illustrated in accordance with at least one exemplary embodiment of this invention. The coiled tag 100 is depicted as having a generally cylindrical shape, however, it should be appreciated that other cross sectional shapes such as, for example, oval, square, rectangular, etc., may be used without departing from the spirit or scope of the invention. Also, the specific dimensions, that is the ratio of circumference to length are not critical to the invention. In generally a smaller circumference will reduce any obtrusion caused by attaching the tag 100 to the grip or other portions of a surgical instrument or tool. However, there may be other applications where larger circumferences may be preferred. It is expected that a variety of different dimensioned tags may be manufactured that exemplify the various embodiments of the invention.

Figure 2:
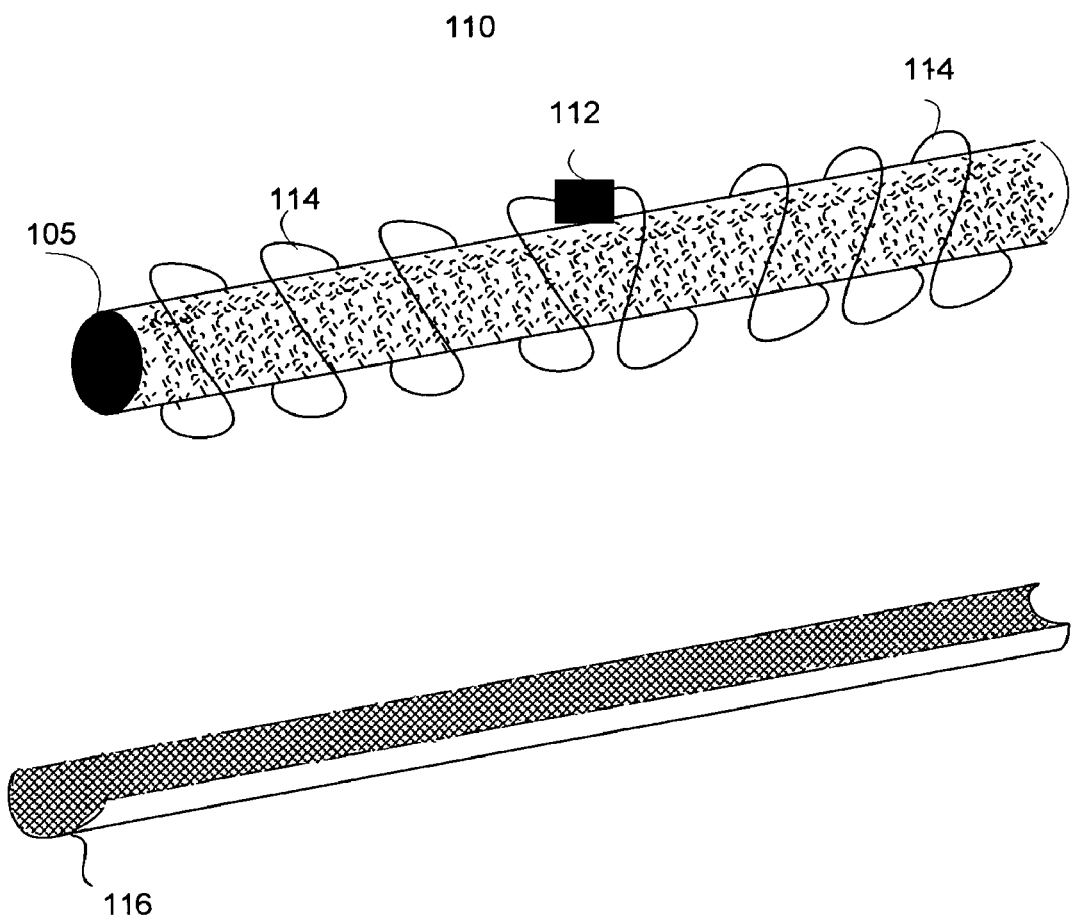
FIG. 2 is an exploded perspective view of a coiled RFID tag highlighting layered tag components according to at least one embodiment of the invention.

Referring to FIG. 2, an exploded view of the coiled tag 100 of FIG. 1 is depicted in accordance with at least one embodiment of the invention. The tag 100 comprises a substrate core 105 and transponder circuit 110 mounted on the substrate core 105. In various embodiments the substrate core may be constructed of silicon, glass, plastic, metal encased in silicon, glass or plastic, or other suitable material. Though in the Figures, the substrate core is shown as solid, it should be appreciated that in various embodiments, the substrate core may be a hollow pipe of substrate material. In various embodiments the substrate core 105 will be made of a non-conductive material to electrically isolate the transponder circuit. Also, in various embodiments, the substrate core 105 will comprise a rigid material thereby adding structural support and resistance to bending to the tag 100.

In various embodiments, the transponder circuit 110 comprises a tag processor 112, which, may be configured in a miniature small outline package (MSOP) for integrated circuits. In various embodiments, the processor 112 will contain a memory having locked and unlocked portions so that data can not only be read from the tag, but also, new data may be written to the tag. The transponder circuit also comprises two antenna portions 114 that circumscribe the substrate 105. Though in the various depicted embodiments, the antenna 114 is shown as a wire antenna, it should be appreciated that the antenna may take different forms as well. For example, the antenna may comprise a layer over the substrate core. The antenna may also be a sheet of conductive foil or other configuration. In the configuration of FIGS. 1 and 2, the antenna portions 114 are connected to the processor 112 in a dipole configuration, that is by two leads on the processor 112. It should be appreciated, however, that other configurations may be used depending upon the type of antenna.

The transponder circuit 110 also comprises a ground plane 116 adjacent to the antenna portions 114. In various embodiment, the ground plane 116 may be formed of a thin sheet of conductive material such as copper, aluminum or other metal and may be configured to cover approximately 180° of the surface of the substrate 105 approximately opposite to the point where the processor 112 is located on the substrate 105 surface. Though the ground plane 116 is depicted as located over the antenna portions 114, it should be appreciated that in various embodiments, the ground plane may be located under the antenna portions 114 with respect to the substrate core 105.

Figure 3:
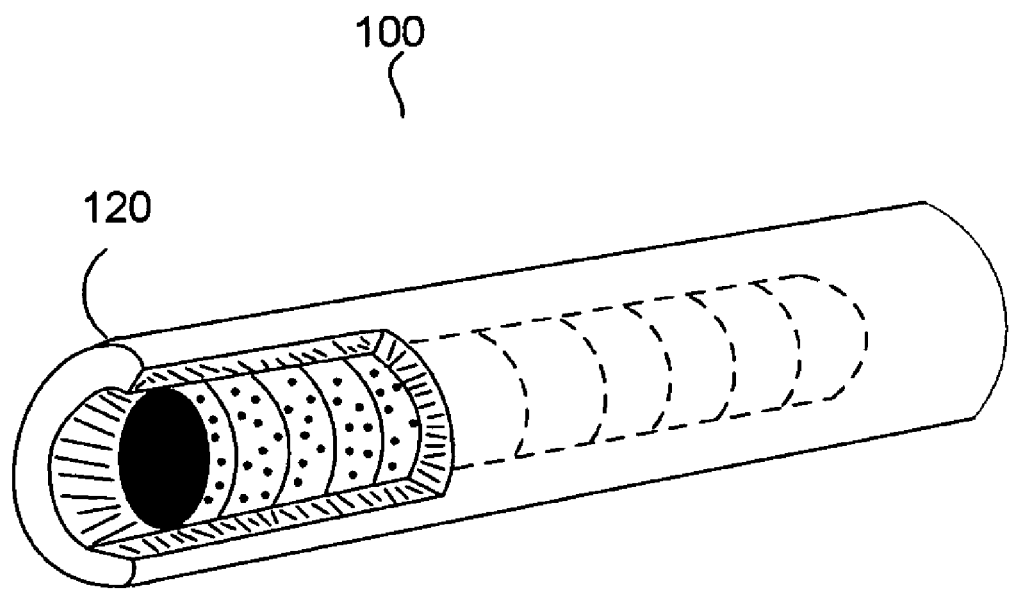
FIG. 3 is a cut away perspective view of another coiled RFID tag encased in a protective shell according to at least one embodiment of the invention.

Referring now to FIG. 3, FIG. 3 is a cut away perspective view of another coiled RFID tag encased in a protective shell according to at least one embodiment of the invention. In the tag 100 depicted in FIG. 3, an outer protective layer 120 has been applied to encase the transponder circuit and substrate core. In various embodiments, the outer protective layer 120 will be formed of a materials such as rubber, silicone, epoxy, plastic, etc., though which, radio frequency signals can easily propagate without significant attenuation, but water, heat, and other contaminants are unable to penetrate. In this manner the tag 100 may be attached to surgical instruments and be able to withstand the rigors of sterilization. Also, the tag may be attached to other hand tools that are used outside in a variety of environmental conditions including heat, moisture, dust, vibration and shock, without damage or with increased resistance to damage. In various embodiments, and as will be discussed in greater detail herein, the encased tag may be formed into another structure that is attached to an item to be tagged or attached directly to a portion of the object.

Figure 4:
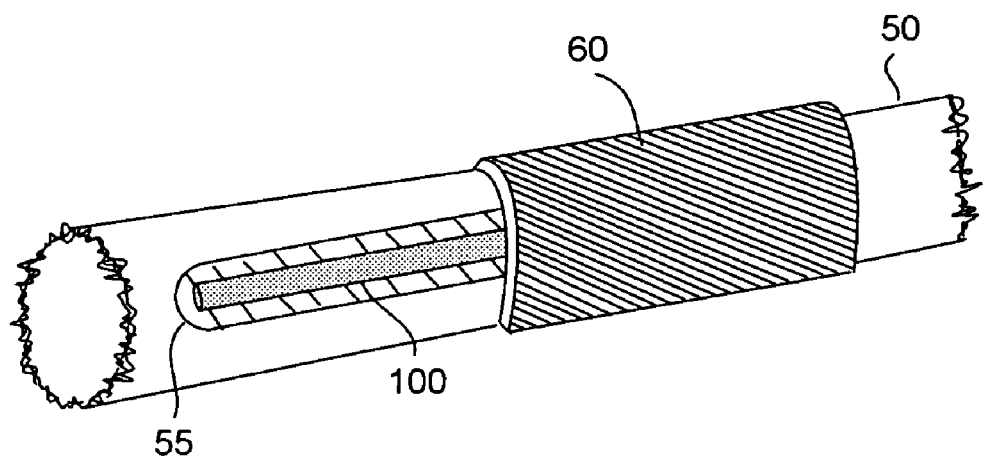
FIG. 4 is a cut away perspective view of a coiled RFID tag that has been overmolded into a portion of an instrument handle in accordance with at least one embodiment of the invention.

FIG. 4 is a cut away perspective view of a coiled RFID tag that has been overmolded into a portion of an instrument handle in accordance with at least one embodiment of the invention. In the embodiment shown in FIG. 4, the tag 100 may be placed in a channel 55 formed in an instrument handle 50 and then covered with a molding material to form a grip. In other embodiments, the tag may simply sit on a surface of the handle 50 without being recessed in a channel. The overmolded grip portion 60 may cover the tag 100 with a uniform thickness so that it is not visible once encased in the overmolded handle 60. In other embodiments, the tag 100 may be visible as a protrusion, bump or other surface discontinuity. In addition, the overmolding may have an indicia, logo, or other symbology that indicates the presence of the embedded RFID transponder tag. In addition to overmolding, which, is typically formed with an injection molding process, in various embodiments, the tag may be formed into a flexible sleeve that can be pulled over a portion of an object such as an instrument handle to secure the tag to the object. The sleeve may have a pocket or recess adapted to receive the tag, or, alternatively, the tag may be molded into the sleeve when the sleeve is manufactured. The sleeve may or may not serve as grip portion when attached to an instrument or other object. Due to the resilient properties of the sleeve as well as friction, the coiled tag may be attached to objects of different dimensions regardless of the tag size and shape and remain securely in place.

As discussed above, the coiled RFID tag according to the various embodiments embodiment may be formed into an overmolded grip portion of a handle portion of a surgical instrument or other hand tool. Alternatively, the tag may be formed into a flexible, resilient sleeve that allows the tag to be attached to objects by merely sliding the sleeve around the distal end of a handle of the surgical instrument or tool up to a location on the handle portion that will minimize obtrusion to the user. In the case of a surgical instrument or tool having a uniformly shaped handle, the coiled RFID tag according to the various embodiments of the invention will intuitively fit at the handle portion. However, with other instruments, tools or equipment, the coiled RFID tag according to the various embodiments of the invention may be attached to a tube, cord, knob, protrusion, or other semi-cylindrical member of an item to be tagged. Alternatively, in various other exemplary embodiments, the coiled RFID tag according to the various embodiments of the invention may be attached to an intervening cylindrically shaped tag fastener which is then secured to the item to be tagged using a cable, twist-tie or other suitable attachment means.

The embodiments of the present inventions are not to be limited in scope by the specific embodiments described herein. For example, although many of the embodiments disclosed herein have been described with reference to coiled RFID tags used to identify surgical instruments, the principles herein are equally applicable to other aspects radio frequency-based identification. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed:

1. A coiled RFID tag comprising:
a substantially cylindrical substrate core having a length and width, with the length longer than the width;
an RFID transponder circuit including a tag processor in a miniature small outline package (MSOP) located on a surface of the length of the substrate core and one or more antenna portions directly connected to the MSOP, the antenna portions circumscribing the length of the substrate core; and a ground plane formed of a sheet of conductive material that covers a portion of the surface along the length of the substrate core.

2. The RFID tag according to claim 1, further comprising a protective outer layer that encapsulates the transponder circuit and substrate core.

3. The RFID tag according to claim 2, wherein the protective outer layer comprises a material selected from the group consisting of plastic, rubber, silicone, epoxy and other electrically insulating, fluid impervious material.

4. The RFID tag according to claim 1, wherein the MSOP is connected to the one or more antenna portions in a dipole configuration.

5. The RFID tag according to claim 4, wherein the MSOP is attached to the length of the substrate core.

6. The RFID tag according to claim 1, wherein the ground plane directly contacts a portion of the transponder circuit.

7. The RFID tag according to claim 1, wherein the substrate core comprises a material selected from the group consisting of plastic, silicon, glass, and other insulating material.

8. The RFID tag according to claim 1, further comprising one or more visual indicia on an outward facing surface of the tag.

9. The RFID tag according to claim 8, wherein the one or more indicia are indicia selected from the group consisting of a brand owner name, a product name, a category name, a color code, a graphic image, a product identification number, a bar code and combinations thereof.

10. An RFID tag comprising:

an RFID transponder circuit including a tag processor in a miniature small outline package (MSOP) located on a surface of the length of the substrate core and one or more antenna portions directly connected to the MSOP, the antenna portions circumscribing the length of a non-conductive cylindrical substrate core having a length and width, with the length longer than the width; and a ground plane formed of a sheet of conductive material that covers approximately 180° of the substrate core surface along the entire length of the substrate.

11. The RFID tag according to claim 10, further comprising a protective outer layer that encapsulates the transponder circuit and substrate core.

12. The RFID tag according to claim 11, wherein the protective outer layer comprises a material selected from the group consisting of plastic, rubber, silicone, epoxy and other electrically insulating, fluid impervious material.

13. The RFID tag according to claim 10, wherein the MSOP is connected to the one or more antenna portions in a dipole configuration.

14. The RFID tag according to claim 13, wherein the MSOP is attached to the substrate core.

15. The RFID tag according to claim 10, wherein the ground plane directly contacts a portion of the transponder circuit.

16. The RFID tag according to claim 10, wherein the substrate core comprises a material selected from the group consisting of plastic, silicon, glass, and other insulating material.

* * * * *